United States Patent [19]
Kneier

[11] 3,840,294
[45] Oct. 8, 1974

[54] MAKEUP GLASSES

[76] Inventor: Dorothy Kneier, 9347 Steele St., Rosemead, Calif. 91770

[22] Filed: May 21, 1973

[21] Appl. No.: 362,261

[52] U.S. Cl.................... 351/59, 351/107, 351/116, 351/120, 351/128, 351/153
[51] Int. Cl. ....... G02c 9/04, G02c 5/20, G02c 1/04
[58] Field of Search ......... 351/55, 59, 61, 107, 111, 351/116, 120, 128, 148, 153, 41

[56] References Cited
UNITED STATES PATENTS

| | | | |
|---|---|---|---|
| 2,374,171 | 4/1945 | Breuker | 351/111 X |
| 2,446,725 | 8/1948 | Seguin | 351/55 |
| 3,495,898 | 2/1970 | Del Vecchio | 351/59 X |

FOREIGN PATENTS OR APPLICATIONS

| | | | |
|---|---|---|---|
| 662,551 | 3/1929 | France | 351/41 |

Primary Examiner—Paul A. Sacher
Attorney, Agent, or Firm—Wolfe, Hubbard, Leydig, Voit & Osann, Ltd.

[57] ABSTRACT

Eyeglass frames for permitting the application of makeup about the eye without interference from the lens or frame components including a bridge member extending solely beneath the eyes and a lens connection to the bridge which permits rotational or transverse movement of the lenses as well as lateral shifting of the lenses with respect to the wearer's eyes. Also, a bridge and temple connecting arrangement is disclosed that enables the bridge and lenses supported thereby to be moved upwardly and downwardly to position the bridge higher and lower on the wearer's nose.

1 Claim, 3 Drawing Figures

MAKEUP GLASSES

BACKGROUND OF THE INVENTION

The invention relates generally to eyeglass frames and more particularly to a frame for glasses which permits the wearer to apply makeup while wearing and using the glasses by means of shifting a lens to an out of the way position or a more suitable position for applying make up.

SUMMARY OF THE INVENTION

The primary aim of the present invention is to provide a novel eyeglass frame arrangement which includes a lens shifting arrangement to permit the wearer to position one or both lenses so that the wearer may apply makeup around the eye without interference from then lens or frame components while utilizing at least one of the lenses to enhance the vision during the makeup applying activity. More specifically, this is accomplished by a bridge member extending solely beneath the eyes and a lens or lens rim connection to the bridge which permits a transverse as well as lateral shifting of the lenses with respect to the wearer's eyes. A further aim is to provide a novel bridge and temple connecting arrangement that enables the bridge and lenses supported thereby to be moved upwardly and downwardly with respect to the wearer's eyes. Other objects and advantags of the invention will become apparent from the foregoing detailed description taken in conjunction with the accompanying drawings.

DESCRIPTION OF THE PREFERRED EMBODIMENTS

Figure 1:
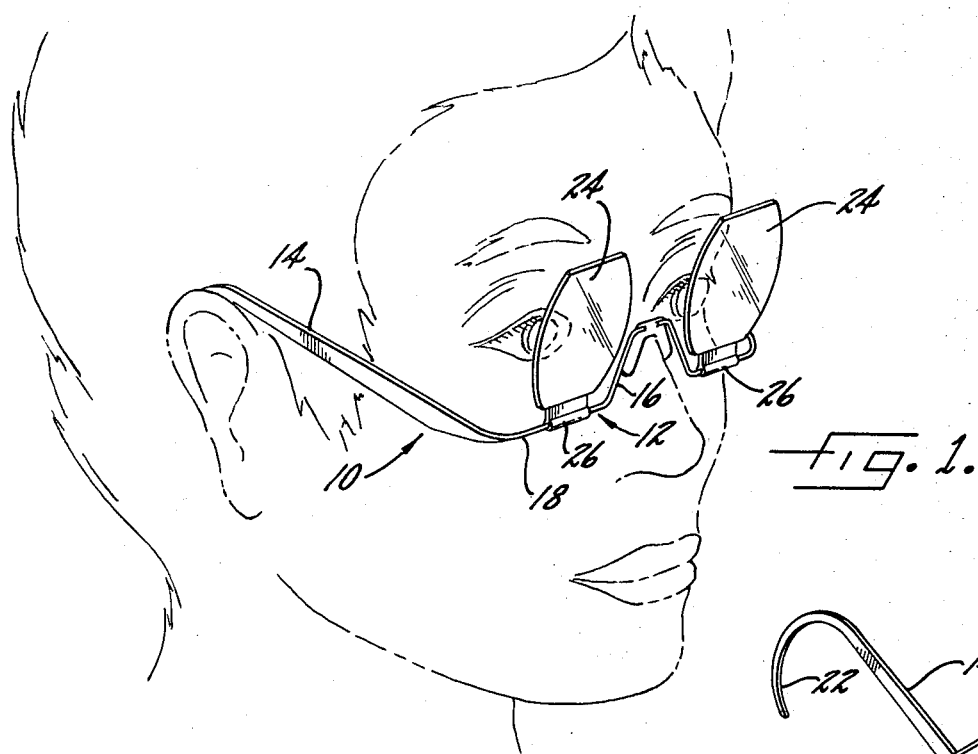
FIG. 1 is a perspective view of the makeup glasses in accordance with the present invention illustrating the manner in which they are worn.
Figure 2:
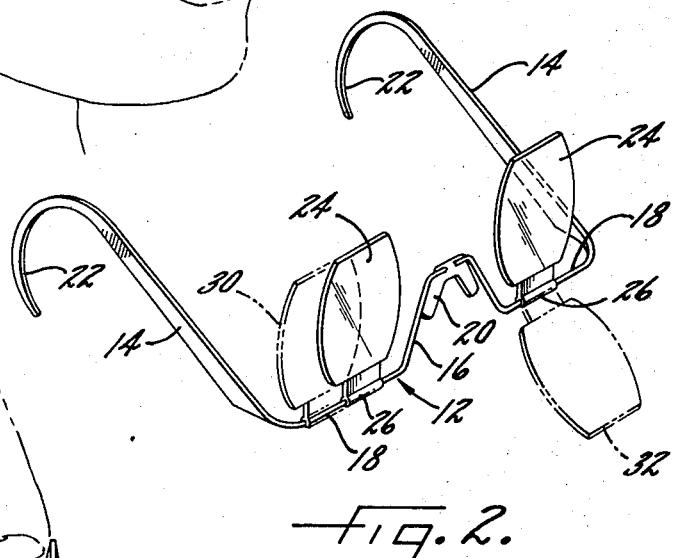
FIG. 2 is an enlarged fragmentary view of the glass frames of FIG. 1 in perspective illustrating the manner in which the lenses may be shifted transversely or laterally with respect to the bridge.

Referring to the drawings for purposes of illustration as viewed in FIG. 1, the invention is embodied in eyeglass frames generally indicated at 10 which are adapted to be worn in a conventional manner wherein a bridge member 12 extends laterally across the cheeks and over the bridge of the nose of the wearer. Temple members 14 connected to the bridge 12 extend rearwardly to rest on or hook about the ears. In the present instance the bridge member 12, as best shown in FIG. 2, includes a generally inverted U-shaped central portion 16 to conform with the wearer's nose and laterally extending legs 18 to span the wearer's cheeks beneath the eyes. The central portion 16 as shown includes nose pads or cushions 20.

In the present instance, the legs 18 of the bridge portion 12 are unitarily formed with temples 14 that comprise perpendicularly bent over extensions of the legs 18. In addition, the temples 14 are upwardly sloped to reach from the cheek to the top of the ear and hooked ends 22 are provided to partially encircle the ears. It will be appreciated by those skilled in the art that the temples 14 may be separate components which are hinged or otherwise suitably connected to the legs 18.

In accordance with the present invention, the lenses 24 are shiftably connected at their lower ends to the respective legs 18 on opposite sides of the central portion 16. For the purpose of providing the requisite shiftability of the lenses 24, connector members 26 secured to the lower end of the lenses hingedly mount to the legs 18 so as to permit transverse or rotational movement of the supported lenses about the legs 18 as an axis, as well as lateral or sliding movement of the lenses along the legs 18.

The arrangement is such that either one or both of the lenses 24 may be shifted laterally as indicated in phantom at 30 to either move the lenses out of the way or for looking sharply to one side or the other. In addition, the lenses may be individually rotated downwardly such as indicated at 32 in phantom (FIG. 2) to enable the wearer to apply eye makeup or the like in the vicinity of the uncovered eye.

It will be appreciated at this point that the lenses which may be prescription type or simply magnifying lenses could include lens linings or rims with the connector 26 being integrally formed or secured thereto, or the connector 26 may be secured to the lenses by a clamp arrangement or the like.

Figure 3:
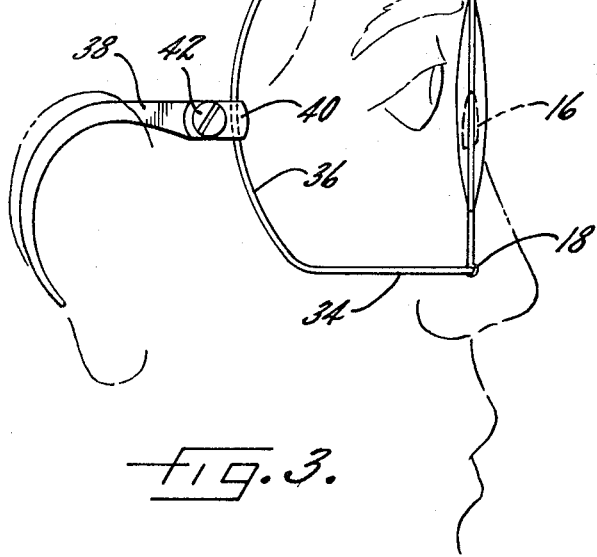
FIG. 3 is a side plan view of the adjustable bridge and temple connection in accordance with another aspect of the present invention.

Turning now to FIG. 3, there is illustrated a slightly modified form of temple bridge connection which permits the bridge to be adjusted upwardly and downwardly with respect to the temple so that the lenses may be selectively positioned in the vertical direction on the face of the wearer. To this end, the bridge leg 18 includes a rearwardly bent perpendicular portion 34 and an upwardly bent arcuate portion 36. The temple 38 is provided with a bent over clamp end 40 having a screw adjustment 42 or the like to vary the clamping pressure on the arcuate end 36 which passes through the clamp 40. The arrangement is such that the arcuate end 36 may be moved upwardly and downwardly within the clamp 40 which in turn positions the inverted U-shaped nose portion 16 of the bridge higher or lower on the wearer's nose.

It will further be appreciated that because of the cantilever-like spring action of the arcuate portion 36 there is created a reaction force component in the inward direction toward the wearer's face so that the bridge portion is held snugly against the face of the wearer.

I claim as my invention:

1. Eyeglass frames particularly adapted for permitting the wearer to apply makeup around an eye, comprising, a bridge member adapted to extend solely beneath the eyes of the wearer, said bridge member having a generally inverted U-shaped central portion to conform with the wearer's nose and laterally extending legs on opposite sides of said central portion to span the wearer's cheeks beneath the eyes, temples connected to said legs for support of the frames by the wearer's ears, a pair of lenses, each of said lenses being disposed on opposite sides of said central portion, and connecting means between the lower ends of said lenses and the respective bridge legs, said connection means being shiftable laterally along said legs and rotatable about said legs as an axis of rotation and wherein each of said legs includes an upwardly bent free end portion and said temples include clamp means for receiving each of said upwardly bent free end portions so that said ends may be moved upwardly and downwardly within clamp means for adjustably positioning the bridge higher and lower with respect to the nose of the wearer.

* * * * *